(12) United States Patent
Sudo et al.

(10) Patent No.: US 6,783,747 B1
(45) Date of Patent: Aug. 31, 2004

(54) GRAPHITE CARBON POWDER, AND METHOD AND APPARATUS FOR PRODUCING THE SAME

(75) Inventors: Akinori Sudo, Kanagawa (JP); Chiaki Sotowa, Kanagawa (JP); Shigeru Murakami, Kanagawa (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 78 days.

(21) Appl. No.: 09/634,461

(22) Filed: Aug. 7, 2000

Related U.S. Application Data
(60) Provisional application No. 60/214,425, filed on Jun. 28, 2000.

(30) Foreign Application Priority Data

Aug. 6, 1999 (JP) .......................................... 11-223565
Jun. 23, 2000 (JP) ................................... P2000-188948

(51) Int. Cl.$^7$ .............................................. C01B 31/04
(52) U.S. Cl. ..................................................... 423/448
(58) Field of Search ........................................ 423/448

(56) References Cited

U.S. PATENT DOCUMENTS

| | | | | |
|---|---|---|---|---|
| 4,015,068 A | * | 3/1977 | Vohler ......................... | 423/448 |
| 4,916,714 A | * | 4/1990 | Antoni et al. ................ | 373/120 |
| 5,344,724 A | * | 9/1994 | Ozaki et al. .................. | 429/94 |
| 6,375,918 B1 | * | 4/2002 | Ota et al. .................... | 423/448 |

OTHER PUBLICATIONS

Sasa, Vapor Pressure and Hysteresis in the Graphite–Bromine System's Carbon vol. 11 p. 497–503 (1973) no month.*

Nakamizo et al., 'Raman Spectra of Ground Natural Graphite' in Carbon vol. 16 pp. 281–283, 1978 no month.*

Miyauchi et al, 'Anomalous Properties and Structure of Graphite–Bromine Residue Compound at High Temperatures' in Carbon vol. 14 pp. 35–38, 1976 no month.*

English Abstract of Japanese Patent Application No. JP62–091411 Date: Apr. 25, 1987.

English Abstract of Japanese Patent Application No. JP 1–272827 Date: Oct. 31, 1989.

English Abstract of Japanese Patent Application No. JP 8–031422 Date: Feb. 02, 1996.

English Abstract of Japanese Patent Application No. JP 8–060444 Date: Mar. 05, 1996.

English Abstract of Japanese Patent Application No. JP 8–060446 Date: Mar. 05, 1996.

* cited by examiner

*Primary Examiner*—Stuart Hendrickson
(74) *Attorney, Agent, or Firm*—Sughrue Mion, PLLC (57) ABSTRACT

An object of the present invention is to provide a method for producing at high productivity graphite powder containing no impurity, in which carbon powder material is effectively heated for graphitization; and an apparatus for producing the graphite powder. Carbon powder is placed in a carbon-made container, and the container is heated through a supply of electricity to the container. An apparatus comprising a heating chamber is provided. The container can be continuously conveyed to the apparatus, heated in the apparatus, and removed from the apparatus. Through use of the apparatus, graphite carbon powder which is suitably employed in a lithium-ion secondary battery can be produced.

9 Claims, 4 Drawing Sheets

GRAPHITE CARBON POWDER, AND METHOD AND APPARATUS FOR PRODUCING THE SAME

CROSS REFERENCE TO RELATED APPLICATIONS

This application is an application filed under 35 U.S.C. §111(a) claiming benefit pursuant to 35 U.S.C. §119(e)(1) of the filing date of Provisional Application No. 60/214,425 filed Jun. 28, 2000 pursuant to 35 U.S.C. §111(b).

TECHNICAL FIELD OF THE INVENTION

The present invention relates to a thermal treatment apparatus for producing a carbon material which is employed as a filler; i.e., which is added, as a composite material, to resin in order to improve the physical properties of the resin, such as electrical conductivity and heat conductivity, or which is employed in a variety of batteries such as a lithium-ion battery which has recently become of interest; and to a thermal treatment method for producing the graphite carbon material.

BACKGROUND OF THE INVENTION

In recent years, portable electronic apparatuses of smaller size, such as cellular phones, video cameras, and notebook computers, have been developed at a remarkable pace. In accordance with this trend, there has been increasing demand for compact secondary batteries of high performance. Particularly, a lithium-ion secondary battery is suitably employed as a power source for a variety of portable electronic apparatuses, since it has high energy density and long service life. Therefore, in recent years, production of lithium-ion secondary batteries has drastically increased, and a further increase is expected in the future.

Graphite material is employed in the anode of a lithium-ion secondary battery, and thus in correspondence with an increase in demand for the battery there has been keen demand for graphite powder.

Carbon material that is easily converted to graphite (hereinafter called "carbon material of easy graphitization") has become of interest as a material for the aforementioned battery or as a filler for a composite material, and extensive studies have been performed on a variety of such carbon materials.

For example, in order to enhance capacity characteristics of the battery, the crystallinity of graphite must be improved, and thus the carbon material must be subjected to heat treatment at 2,500° C. or more for graphitization.

Conventionally, the following two methods are available for producing a mass of graphite micropowder:

(1) a method in which material of easy graphitization is heated at high temperature, and then the graphitized material is crushed, producing graphite powder.

(2) a method in which material of easy graphitization is crushed in advance, and then the crushed material is heated at high temperature.

In method (1), carbon material of easy graphitization, such as any of a variety of cokes, is heated by means of resistance heating of filler carbon powder in powder to which electricity is supplied; i.e., the material is graphitized by means of an Acheson furnace. Alternatively, the material is graphitized by means of a heating furnace comprising a graphite heater. Subsequently, the resultant graphite is crushed, producing graphite powder. At the present time, the method is typically employed, but the method involves some drawbacks. For example, graphitized carbon is smooth (i.e., graphitized carbon is usually employed as a lubricant), and when the graphitized carbon is crushed, flakes tend to form. Thus, when such flakes are employed in an electrode, the flakes are deposited on the surface of the electrode, the surface becomes mirror-like, and the electrode has poor permeability for an electrolyte. As a result the performance of a battery comprising the electrode may deteriorate. Therefore, method (1), in which graphitized material is crushed, cannot produce graphite powder which is suitable for use in batteries and a variety of composite materials; i.e., which exhibits excellent characteristics.

In method (2), material to be treated; i.e., carbon material of easy graphitization, such as coke, is crushed in advance into powder of a suitable particle size. Subsequently, the powder is placed and sealed in a crucible made of carbon, and the crucible is placed in a furnace for graphitization, to thereby produce graphite powder.

This method is preferable from the view that coke is easily crushed as compared with graphite, and that flakes rarely form when coke is crushed as compared with when graphite is crushed.

Therefore, in method (2), graphite powder which is suitably employed in the anode of a lithium-ion secondary battery is produced. However, method (2) involves some problems with regard to heat treatment, as follows.

Carbon material to be heated assumes the form of powder, and thus the material must be placed in a heat-resistant container such as a crucible before the material is heated. Conventionally, a variety of apparatuses and methods have been available for heating the material in a container such as a crucible.

For example, as described above, a crucible containing carbon material is buried in coke powder which is placed in an Acheson furnace, electricity is supplied to the coke powder, and the carbon material in the crucible is heated by means of heat generated from the coke, to thereby graphitize the carbon material. However, this method is of batch-type, and thus a prolonged period of time is involved in carrying out a cycle involving elevating the furnace temperature, heating at a predetermined temperature, and lowering the furnace temperature. In addition, placing the coke powder in the furnace is troublesome, as is removing the powder after completion of heat treatment. Therefore, productivity is considerably poor and the process is unsuitable for mass production.

Furthermore, there is a possibility that the carbon material to be heated will be contaminated with gas of sulfur or metal which is generated from the filler powder and migrates into the carbon material. Such contamination caused by migration of gas may deteriorate the characteristics of graphite carbon powder and may impair battery characteristics.

The temperature within the furnace may vary greatly from position to position in the furnace in accordance with the packing density of the filler powder. Therefore, crucibles containing the carbon material must be placed in the furnace such that the temperatures of the crucibles become as uniform as possible, and thus control of the crucibles may be troublesome. In addition, in order to make the temperatures of the crucibles uniform, the crucibles must be heated for a relatively long time. As a result, carbon material particles tend to stick to one another, and therefore require re-crushing.

A high-frequency induction furnace or a resistance furnace comprising a heater have also been used. These furnaces are provided with a tubular heating zone, and crucibles, whose size is commensurate with the inner diameter of the tube, are continuously passed through the tubular portion in one direction for heating. In such a furnace, gas is not generated, and material can be subjected to heat treatment continuously.

However, in a method in which a furnace comprising a graphite tube serving as a heater is employed, for example, a crucible and powder contained in the crucible are heated by means of heat which is transferred or radiated from the tube. Therefore, in order to raise the temperature of material to be heated to approximately 3,000° C., the heater must be heated to a temperature greatly in excess of 3,000° C. However, at a temperature higher than 3,000° C., the heater itself is considerably consumed, and the service life of the heater is shortened. Incidentally, in order to treat a large amount of the material, the size of the crucible must be increased, and in accordance with an increase in crucible size, the size of the tube must be increased. In addition, the number of heaters must be increased, which causes an increase in equipment costs. Therefore, employing the method industrially is difficult.

There has conventionally been a method in which high-frequency is employed and heating is carried out by means of induction current. The method is efficient from the view that material contained in a crucible is continuously passed through a graphite tube. However, the material assumes the form of powder, and thus resistance of the material is too high for employment of induction heating of the material. Therefore, in order to heat the material, induction heating of the tube or the crucible must be employed.

In the method, heat that is radiated from the tube is mainly employed for heating the material, and when heating is carried out at 3,000° C. or higher, the tube itself is considerably consumed and impaired. In addition, graphite tubes are usually expensive. Furthermore, the method requires large-scale apparatuses such as an induction coil and a high-frequency oscillator. In order to treat a large amount of the material, a larger-scale apparatus is required. As a result, the cost of the apparatus increases, and maintenance and control of the apparatus become troublesome.

There is a common problem in relation to heat treatment of carbon powder contained in a crucible. Namely, when any apparatus is employed, the bulk density of carbon powder and the packing ratio of carbon powder are low. Therefore, since electrical conductivity and heat conductivity of the carbon powder are low, neither the size of a crucible nor the size of the apparatus can be increased.

SUMMARY OF THE INVENTION

In connection with carrying out graphitization through heating at a high temperature, for example, at 2,500° C. or higher, of material of easy graphitization which has been formed into powder or particles in advance, the present invention provides the following:

(1) a method and an apparatus for graphitizing a large amount of the material efficiently within a short period of time at low cost;

(2) prevention of sintering of the material, to the extent possible, through heat treatment within a short period of time;

(3) elimination of contamination by impurity gas during graphitization of the material so as to eliminate the adverse effect of the impurity on characteristics of a battery in which the graphite is employed; and (4) suppression of operation cost which is attributed to exchange of apparatus parts.

In order to solve the aforementioned problems, the present inventors have performed extensive studies, and have found that excellent graphite powder can be produced by heating a container containing carbon powder, through a supply of electricity to the container.

Accordingly, the present invention provides:

(1) A method for producing graphite carbon powder, characterized by filling a container made of carbon with carbon powder which has been prepared from carbon material through crushing in advance, and heating the carbon powder for graphitization by means of ohmic-resistance heating of the container through a supply of electricity to the container.

(2) A method for producing graphite carbon powder as described in (1) above, wherein the container is employed in a plurality of numbers such that the containers are stacked one on another, electricity is applied from one end of the stacked containers to an opposite end, and ohmic resistance at contact faces of the stacked containers is utilized as a main source of ohmic-resistance heating.

(3) A method for producing graphite carbon powder as described in (1) above, wherein the container is divided into portions in a direction perpendicular to a longitudinal direction of the container, and the divided portions are assembled to constitute a single container.

(4) A method for producing graphite carbon powder as described in any one of (1) to (3) above, wherein electricity is applied from a water-cooled graphite guide electrode which is pressed to the end of the container.

(5) A method for producing graphite carbon powder as described in (4) above, characterized in that graphite material which is inserted between the end of the container and the guide electrode prevents heat loss at the end of the graphite container.

(6) A method for producing graphite carbon powder as described in (5) above, characterized in that the graphite containers, the graphite materials and the guide electrodes are covered with carbon powder and/or carbon fiber so that the heating part is insulated and prevented from oxidatior (7) A method for producing graphite carbon powder as described in (5) above, wherein at least any one of the part of the graphite containers, the graphite materials or the guide electrodes is placed in an inert gas atmosphere.

(8) A method for producing graphite carbon powder as described in any one of (1) to (3) above, wherein the carbon powder is heated at a temperature of 2,500° C. to 3,300° C.

(9) A graphite powder which is prepared by means of the method as described in (8) above and which has an interlayer distance ($C_0$) in a C-axis direction in crystal of 6.730 Å or less.

(10) A graphite powder which is prepared by means of the method as described in (8) above and which has an interlayer distance ($C_0$) in a C-axis direction in crystal of 6.725 Å or less.

(11) A heating apparatus for graphite carbon powder which comprises a heating chamber including a feeding section for feeding a container filled with carbon powder; a heating section for heating the container, the heating section comprising terminal electrodes for supplying electricity to the container; and a removal section for removing the container after heating, and which apparatus allows the container to be conveyed from the feeding section to the heating section and then to the removal section, so that the container is heated within the heating chamber through a supply of electricity thereto.

(12) A graphite powder which is prepared by means of the method as described in (11) above and which has an interlayer distance ($C_0$) in a C-axis direction in crystal of 6.730 Å or less.

(13) A graphite powder which is prepared by means of the method as described in (11) above and which has an interlayer distance ($C_0$) in a C-axis. direction in crystal of 6.725 Å or less.

(14) An electrode material for a lithium-ion secondary battery which makes use of the graphite carbon powder as described in any one of (9),(10),(12) or (13) above.

DETAILED DESCRIPTION OF THE PREFERRED EMBODIMENT

Figure 1:
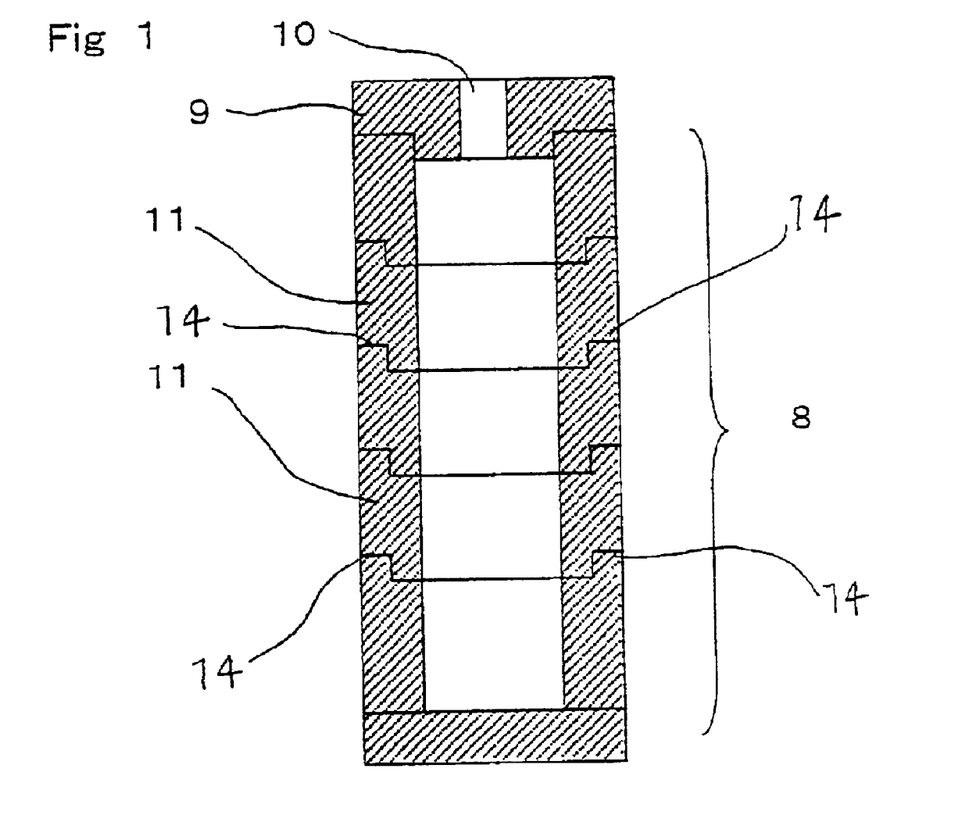
FIG. 1 is a sectional view of a container which is employed in the present invention.

The present invention will next be described in more detail. An object of the present invention is to employ, as a heater, a container corresponding to a crucible. The container serving as a heater can be a carbon crucible or divided into one or more portions 11 in a direction perpendicular to a longitudinal direction as shown in FIG. 1. In the latter case, the container 8 comprises the thus-divided portions 11, and contact resistance between the portions 11 mainly produces resistance heat during a supply of electricity. Therefore, heating and cooling can be carried out rapidly, and productivity of graphite powder becomes high.

Figure 5:
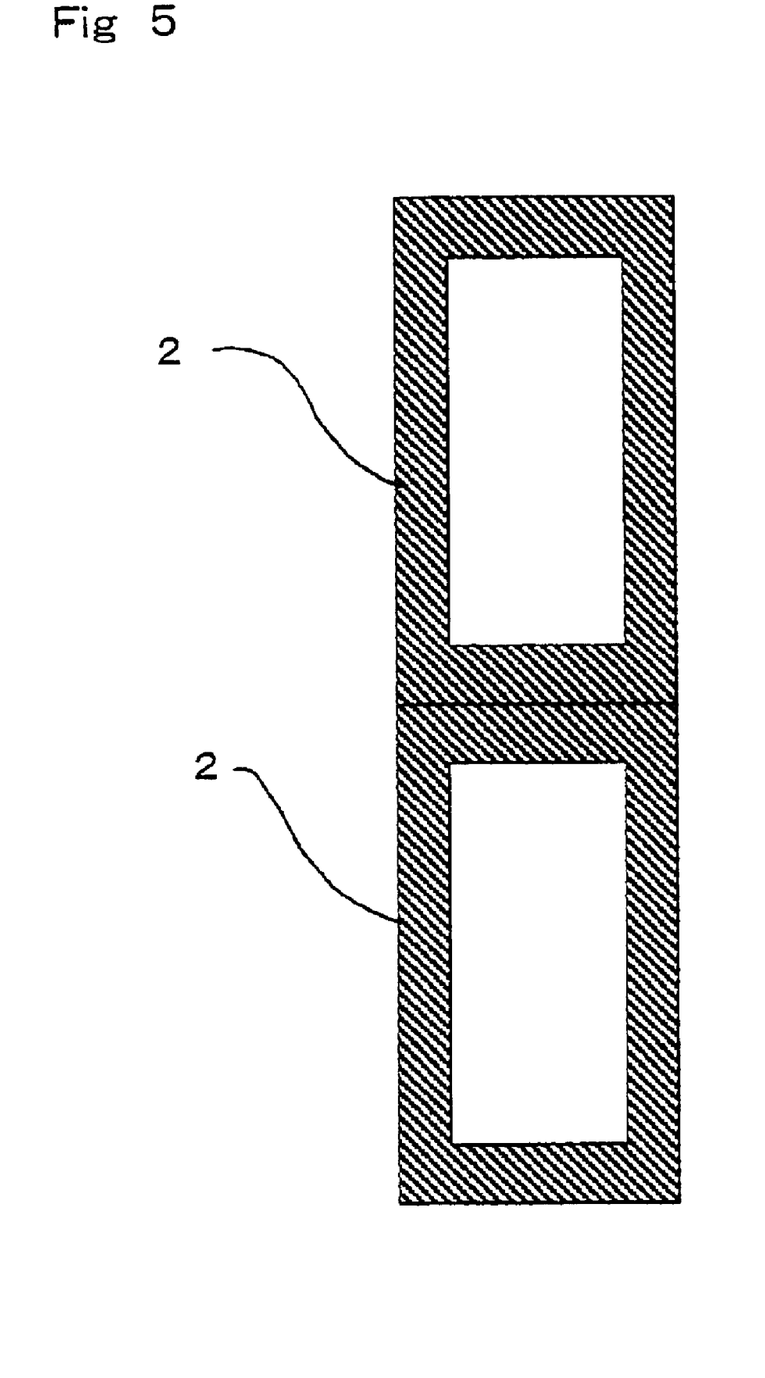
FIG. 5 shows a sectional view of another container which is employed in the present invention.

Alternatively, when several crucibles, none of which are divided into portions, are aligned and connected with one another as shown in FIG. 5 and electricity is supplied to the crucibles, the crucibles exhibit an effect similar to that of the aforementioned divided crucible.

The container serves as a heater, and thus it must be endowed with electrical resistance and also electrical conductivity. Also, generation of impurities must be suppressed in the container, and the container must have heat resistance at 3,000° C. or higher. Therefore, the container is produced from carbon, preferably graphite.

FIG. 1 is a schematic representation showing the container 8 which is divided into several portions 11. The container 8 may have a round or square cross section, but in order to make heating of the inside uniform, the cross section is preferably round. After powder is provided in the container, a cap 9 is screwed into and fixed to the container at an end, and then electricity is supplied to the container at both ends.

An opening 10 shown in FIG. 1 is a ventilation hole which facilitates substitution of air by inert gas. As described below, the opening 10 is provided, since air in the container is preferably substituted by inert gas before heating through a supply of electricity.

In portions 14 shown in FIG. 1, contact portions may be formed with loose-fitting screw threads, or carbon rings may be provided between the contact portions, to thereby secure sufficient contact resistance as required for heating through a supply of electricity.

Meanwhile, divided portions, each serving as a crucible, may be stacked to thereby exhibit an effect similar to that of the aforementioned container.

In consideration of practical use, when the size of the container is large, the amount of material which is treated in one batch is large, and thus productivity is high. However, when the size of the container is large, the thickness of powder portion in which heat conductivity is low becomes large, and a long time is required for heat transfer. In addition, a heating apparatus itself may become large and involve high equipment cost. Therefore, in consideration of production cost, the size of the container is preferably determined so as to be commensurate with the amount of graphite powder which is to be produced.

In the present invention, the container serves as a heater and heats powder contained therein, and thus only a wall produced from heat-insulating material is provided around the container.

Direct current is fed to the container through the guide electrode which contacts the end of the container. The guide electrode is favorably made from graphite that is the same as the crucible which has conductivity and heat-resistance. And this guide electrode is favorably water-cooled because it is also heated when direct current is fed.

Figure 3:
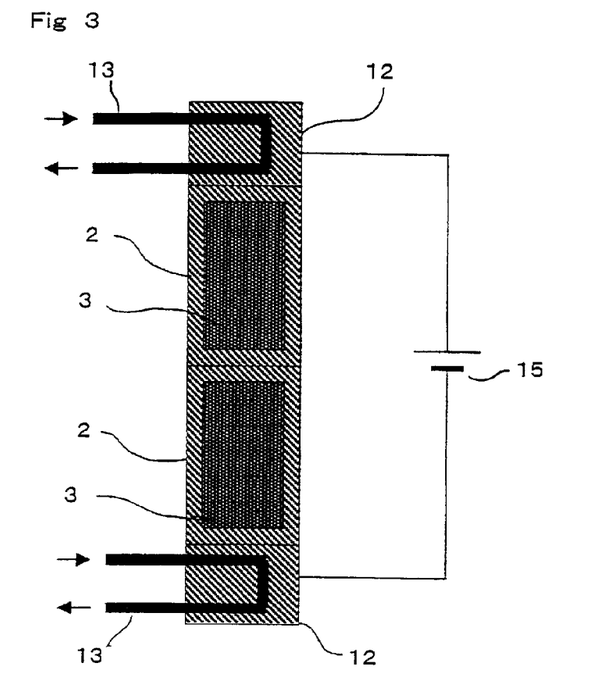
FIG. 3 shows a water-cooled graphite guide electrode which is employed in the present invention.

FIG. 3 shows an example of the water-cooled guide electrode 12. This example shows that pipe 13 for water-cooling is embedded into the guide electrode. The pipe 13 can be rolled around the guide electrode.

Figure 4:
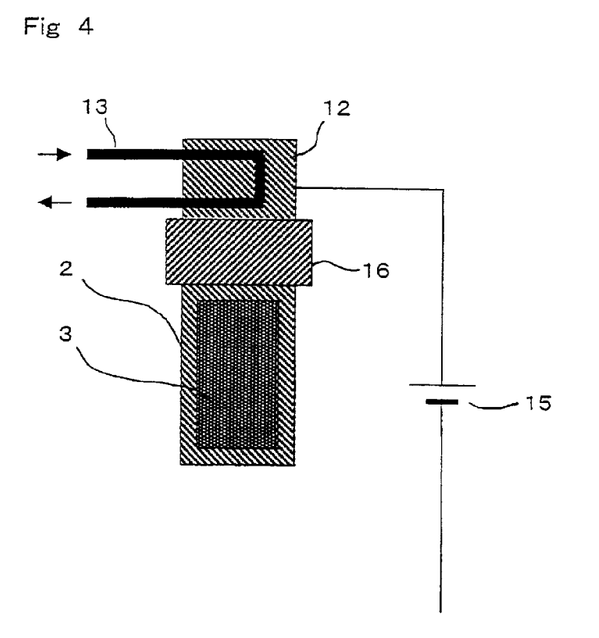
FIG. 4 shows a graphite material inserting between water-cooled graphite guide electrode and container which is employed in the present invention.

But the temperature of the contact surface between the cooled guide electrode 12 and the container 2 goes down compared to other part of the container. So to prevent the drop of the temperature, thin graphite material 16 can be inserted between the guide electrode 12 and container 2 as shown in FIG. 4.

The graphite crucible, the graphite material and the guide electrode are easily oxidized in the air. It is favorable to cover at least one part of these with carbon powder or carbon fiber such as carbon felt or carbon mat for heat-insulation and de-oxidation. In addition to these steps, it is favorable that inert gas flows during heating for the effect of de-oxidation . And when inert gas continues to flow during heating through a supply of electricity and during cooling after the heating, generated impurity gas is removed together with inert gas, and the resultant graphite material has high purity as compared with graphite produced through a conventional method. In the method, inert gas may be helium, argon, krypton, or neon, but argon is preferable in consideration of cost.

In order to enhance crystallinity of graphite, carbon powder must be heated at 2,500° C. or higher. However, when the heating temperature is excessively high, the container itself is damaged. In addition, even when carbon powder is heated at very high temperatures, graphitization of the carbon powder is limited. Therefore the upper limit of the heating temperature is 3,300° C.

By heating carbon material over 2,500° C. through the above-described method after crushing, graphitized carbon powder having an interlayer distance ($C_0$) in a C-axis direction in crystal of 6.730 Å or less can be obtained. Also by crushing boron-compound such as B4C, mixing with carbon powder and heating through the above-described method, graphitized carbon powder having an interlayer distance ($C_0$) in a C-axis direction in crystal of 6.725 Å or less can be obtained.

In addition, polyvinylidene fluoride powder is added to the carbon powder in an amount of some %, the mixture is kneaded through addition of N-methylpyrrolidone (NMP), and the resultant mixture is pressed on copper mesh and then dried, to thereby produce an anode electrode for a lithium-ion secondary battery.

The following steps may be carried out in one heat-insulated chamber: a step in which a container (crucible) containing carbon powder is evacuated and gas in the crucible is substituted; heating through a supply of electricity is carried out while inert gas is caused to flow; and a step in which cooling is carried out after completion of a supply of electricity. In this case, one or more containers may be provided, and a plurality of containers may be treated by provision of a plurality of electricity supply apparatuses. In addition, an object of the present invention is to enable mass production of graphite powder by preparation of a number of containers and by provision of an apparatus in which introduction of the containers, evacuation of the containers, supply of inert gas, a supply of electricity, and removal of the containers are carried out successively.

Figure 2:
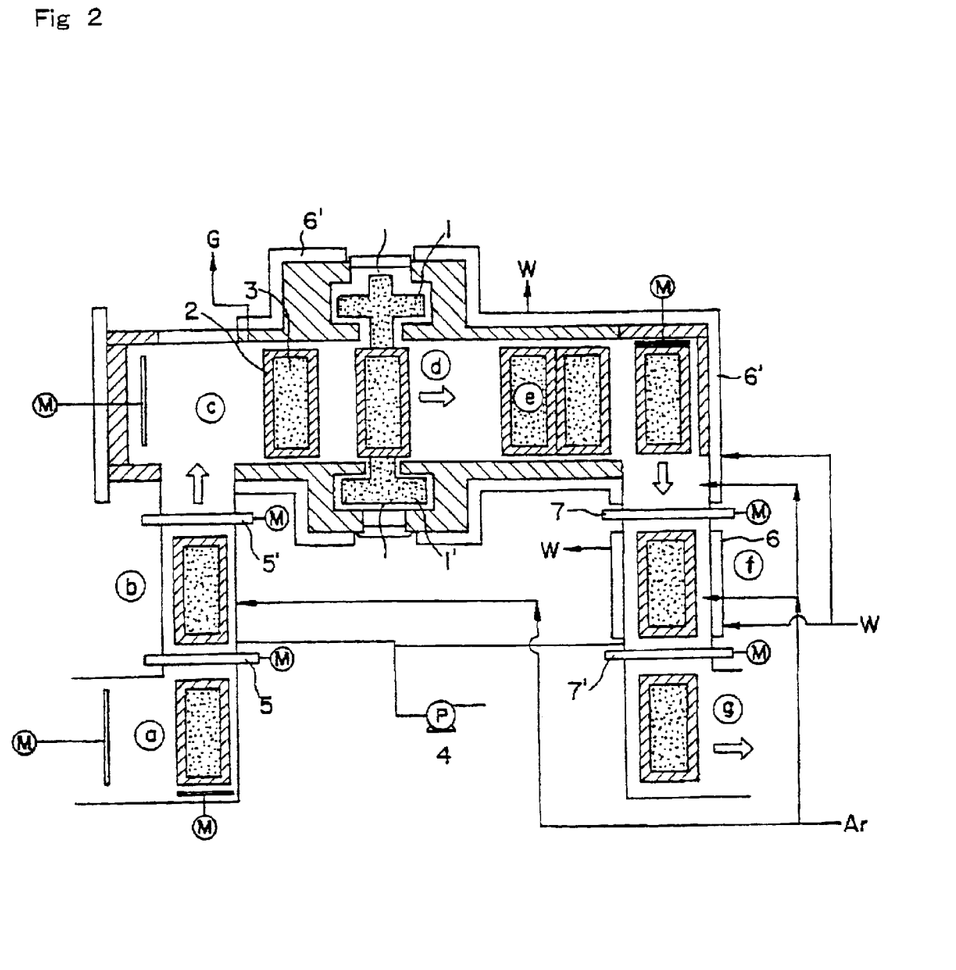
FIG. 2 shows an apparatus of the present invention, in which containers are continuously subjected to heat treatment.

The present invention will next be described with reference to an apparatus shown in FIG. 2. FIG. 2 shows an example of continuous heat treatment apparatus comprising heat-insulated chambers which communicate through. The apparatus comprises terminal electrodes 1 and 1' for electricity-supply heating at a central portion. A container 2 containing powder 3 is conveyed from an inlet (a) to an evacuation-gas substitution chamber (b) and then to a furnace (c). Subsequently, the container is conveyed through an electricity supply heating zone (d), a cooling zone (e), and a cooling chamber (f) which shuts out air, and the container is removed from an outlet (g).

The container is conveyed in the apparatus in a lateral or longitudinal direction on a smooth slide board having a rail shape or on a roller conveyer through a conveying means such as a pusher or a conveyer. The evacuation-gas substitution chamber (b) comprises shutters 5 and 5' at the inlet and outlet thereof, and air is shut out by the shutters.

Before the container is placed in the gas substitution chamber (b), the outlet shutter 5' is closed. After the inlet shutter 5 is opened, the container is put into the chamber (b) and then the shutter 5 is closed. Subsequently, the chamber (b) is evacuated and argon gas is introduced therein, to thereby carry out gas substitution.

Thereafter, the outlet shutter of the gas substitution chamber (b) is opened, and the container is conveyed to the heating chamber (c) into which argon gas has been introduced in advance.

In the apparatus, a number of containers are continuously heated, and thus the inlet of the heating chamber (c) is maintained at a predetermined temperature. In contrast, the containers must be cooled after a supply of electricity, and thus the inner wall of the cooling chamber (f) is covered with heat-insulating carbon material, and the outer wall of the cooling chamber (f) is covered with a water-cooling jacket 6'.

When electricity is supplied to the container via the terminal electrodes 1 and 1', in order to avoid interruption of conveyance of the container, for example, the terminal electrode 1 may be moved in a direction of electricity supply when the container is conveyed into the heating zone.

After being set at a predetermined position, the container is clamped by the terminal electrodes and electricity is supplied to the container. If necessary, a plurality of terminal electrodes may be provided, although such electrodes are not shown in FIG. 2.

After a supply of electricity is initiated, the container is maintained for a predetermined time until the temperature of the inside of the container becomes substantially uniform. Subsequently, the container is heated until a predetermined heat treatment.

Thereafter, the container (crucible) is removed from the terminal electrodes, conveyed to the cooling zone (e), and passed through the cooling zone (e), which is covered with insulating material inside and with the water cooling jacket outside. Subsequently, the container is conveyed to the chamber (f), which is filled with argon gas, the outer wall of which is cooled with a water cooling jacket. The container is cooled in the chamber (f) for a predetermined time while shutters 7 and 7' are closed. After the container has been cooled to a predetermined temperature, the shutter 7' is opened, and then the container is removed from the outlet of the apparatus to the outside.

After removal of the container, the shutter 7' of the chamber (f) is closed again, the chamber is evacuated and filled with argon gas, and the chamber is maintained as is until the next container is conveyed thereto.

EXAMPLES

There will next be described an example of graphitization by use of the above-described apparatus through the method of the present invention. Unless otherwise indicated herein, all parts, percents, ratios and the like are by weight.

Example 1

A cylindrical graphite crucible as shown in the schematic representation of FIG. 1 was prepared. The outer diameter of the crucible, the thickness of the wall, and the entire length of the crucible were 200 mm, 20 mm, and 700 mm, respectively. The crucible was divided into six portions, and carbon fiber sheets were provided between the surfaces with which the portions were brought into contact. A graphite screw cap was applied to the container, and two holes having a diameter of 20 mm for ventilation were produced in the cap.

Coke powder (product of Nippon Steel Chemical Co., Ltd.), which had been crushed so as to attain a mean particle size of 20 $\mu$m and had been subjected to classification in advance, was added to the crucible, and the crucible was capped. The crucible was conveyed to an evacuation chamber, and the chamber was evacuated to 20 mmHg or less by use of a vacuum pump. A vacuum valve was closed, and argon gas was fed to the chamber until the chamber attained atmospheric pressure. Subsequently, the crucible was conveyed to a heating chamber having an argon atmosphere, electrodes were set on both ends of the crucible, and electricity was gradually supplied to the crucible by use of direct power supply.

After about two hours, the crucible was confirmed to reach 3,100° C., and was thereafter maintained at the temperature for 20 minutes. Thereafter, the supply of electricity was stopped, and the crucible was cooled. When the temperature of the crucible reached 400° C., the crucible was removed from the apparatus. After the crucible was allowed to stand in air, powder in the crucible was recovered.

In order to measure the degree of graphitization of the thus-produced powder, the crystallinity of the powder was analyzed by means of X-ray diffraction, and $C_0$ was found to be 6.728 Å. This $C_0$ value is similar to that of graphite which has been batch-graphitized in an Acheson furnace, and the above-produced graphite powder can be employed for producing the anode electrode of a battery. With regard to impurities, the graphite powder contained Fe and Nd in amounts of 50 ppm or less.

Example 2

Using a cylindrical graphite crucible same as Example 1, 95 wt % of coke powder (product of Nippon Steel Chemical Co., Ltd.), which had been crushed so as to attain a mean particle size of 20 μm and had been subjected to classification in advance, and 5 wt % of boroncarbide (B4C) (product of Denka Co., Ltd.), which had been crushed so as to attain a mean particle size of 20 μm and had been subjected to classification in advance, were mixed by Henchel-mixer (made by Mitsui Miike Co., Ltd.) at 800 rpm and 5 minutes. Then it was added to the crucible, and the crucible was capped.

The crucible was conveyed to an evacuation chamber, and the chamber was evacuated to 20 mmHg or less by use of a vacuum pump. A vacuum valve was closed, and argon gas was fed to the chamber until the chamber attained atmospheric pressure. Subsequently, the crucible was conveyed to a heating chamber having an argon atmosphere, electrodes were set on both ends of the crucible, and electricity was gradually supplied to the crucible by use of direct power supply.

After about two hours, the crucible was confirmed to reach 3,100° C., and was thereafter maintained at the temperature for 20 minutes. Thereafter, the supply of electricity was stopped, and the crucible was cooled. When the temperature of the crucible reached 400° C., the crucible was removed from the apparatus. After the crucible was allowed to stand in air, powder in the crucible was recovered.

In order to measure the degree of graphitization of the thus-produced powder, the crystallinity of the powder was analyzed by means of X-ray diffraction, and $C_0$ was found to be 6.718 Å. The above-produced graphite powder can be employed for producing the anode electrode of a battery. With regard to impurities, the graphite powder contained Fe and Nd in amounts of 100 ppm or less each.

Comparative Example 1

Heating treatment was carried out by use of a material similar to that employed in Example 1 under conditions similar to those in Example 1. However, an opening for ventilation was not provided on a crucible.

Comparative Example 2

Heating treatment was carried out by use of a container and a material which were similar to those employed in Example 1 under conditions similar to those in Example 1. However, evacuation and argon gas substitution were not carried out before heating, and the container was heated in a non-argon atmosphere.

In Comparative Examples 1 and 2, the amounts of Fe and Nd, which were impurities in the graphite powder, were found to increase to 150 ppm and 420 ppm, respectively.

Comparative Example 3

Heating treatment was carried out by use of a container and a material which were similar to those employed in Example 1. The container was heated to 2,400° C. and maintained for two hours, and then cooled and treated in a manner similar to that in Example 1. The crystallinity of the graphite powder was analyzed, and $C_0$ was found to be 6.738 Å, which revealed that the degree of graphitization was slightly low.

Measurement of Battery Properties

The graphite powder which was made from Examples 1 and 3, and Comparative Example 3, having added thereto 3 wt % of polyvinylidene fluoride powder and N-methylpyrrolidone, was kneaded and press-bonded to a copper mesh to form a negative electrode. For evaluating properties of this electrode as a single pole, a three-pole cell using lithium metal for the counter electrode and the reference electrode was manufactured.

The electrolytic solution used was a mixed solution of ethylene carbonate having dissolved therein 1 mol/l of $LiPF_6$ with dimethylene carbonate (1:1 by volume).

At the charging and discharging of the battery, the electric potential was controlled to 0.2 mA/cm² in both the charging and discharging.

The result was that the graphite powder made from Example 1 revealed discharge capacity 301 mAh/g, initial efficiency 85%, and the graphite made from Example 3 revealed discharge capacity 330 mAh/g, initial efficiency 90%. Both results are sufficient for an anode of lithium-ion secondary battery.

In the present invention, carbon material for lithium-ion battery is formed into powder or particles in advance, and the carbon material is heated at a high temperature of 2,500° C. or higher for graphitization, by heating a container containing the powder or particles through a direct supply of electricity to the container. In addition, in the present invention, a plurality of containers can be continuously heated in a relatively convenient apparatus. Therefore, in the present invention, graphite powder which contains no impurities and is suitably employed in a lithium-ion battery can be effectively produced in large amounts within a short period of time.

In addition, in the present invention, graphite carbon can be produced at low cost, since the apparatus and the container are rarely consumed. Furthermore, the method of the present invention is excellent in view that when carbon powder mixed with a graphitization catalyst such as boron is graphitized, graphitization is completed within a short period of time and the carbon powder is not sintered. Therefore graphitization is effectively accomplished.

While the invention has been described in detail and with reference to specific embodiments thereof, it will be apparent to one skilled in the art that various changes and modifications can be made therein without departing from the spirit and scope thereof.

It is claimed:

1. A method for producing graphite carbon powder, comprising filling a container made of carbon having electrical resistance and electrical conductivity with carbon powder which has been prepared from carbon material through crushing in advance, supplying electrical current directly to the container, and passing electrical current through the container to thereby heat the carbon powder for graphitization by means of ohmic-resistance heat generated from the container.

2. A method for producing graphite carbon powder according to claim 1, wherein the container is employed in a plurality of numbers such that the containers are stacked one on another, electricity is applied from one end of the stacked containers to an opposite end, and ohmic resistance at contact faces of the stacked containers is utilized as a main source of ohmic-resistance heating.

3. A method for producing graphite carbon powder according to claim 1, wherein the container is divided into portions in a direction perpendicular to a longitudinal direction of the container, and the divided portions are assembled to constitute a single container.

4. A method for producing graphite carbon powder according to any one of claims 1 through 3, wherein electricity is applied from a water-cooled graphite guide electrode which is pressed to the end of the container.

5. A method for producing graphite carbon powder according to claim 4, wherein graphite material is inserted between the end of the container and the guide electrode to prevent heat loss at the end of the graphite container.

6. A method for producing graphite carbon powder according to claim 5, wherein the graphite containers, the graphite materials and the guide electrodes are covered with carbon powder and/or carbon fiber so that the heating part is insulated and prevented from oxidation.

7. A method for producing graphite-carbon powder according to claim 5, wherein at least any one of the part of the graphite containers, the graphite materials or the guide electrodes is placed in an inert gas atmosphere.

8. A method for producing graphite carbon powder according to any one of claims 1 to 3, wherein the carbon powder is heated at a temperature of 2500° C. to 3300° C.

9. A method for producing graphite carbon powder according to claim 1, wherein the container has guide electrodes disposed on opposite ends thereof and in electrical contact with the container, and said step of supplying electrical current directly to the container comprises applying a power source across said guide electrodes.

\* \* \* \* \*